US012637802B1

(12) United States Patent
Lian

(10) Patent No.: US 12,637,802 B1
(45) Date of Patent: May 26, 2026

(54) LAUNDRY HAMPER

(71) Applicant: Fujian EastWest Lifewit Technology Co., LTD., Fuzhou (CN)

(72) Inventor: Feng Lian, Fuzhou (CN)

(73) Assignee: Fujian Eastwest Lifewit Technology Co., Ltd., Fuzhou (CN)

( * ) Notice: Subject to any disclaimer, the term of this patent is extended or adjusted under 35 U.S.C. 154(b) by 0 days.

(21) Appl. No.: 19/277,816

(22) Filed: Jul. 23, 2025

(30) Foreign Application Priority Data

Jun. 13, 2025 (CN) ......................... 202521208552.1

(51) Int. Cl.
*D06F 95/00* (2006.01)
*B65D 1/06* (2006.01)
*B65F 1/06* (2006.01)

(52) U.S. Cl.
CPC ............ *D06F 95/004* (2013.01); *B65F 1/065* (2013.01)

(58) Field of Classification Search
CPC ...... D06F 95/004; D06F 95/002; B65F 1/065; B65F 1/06; B65F 1/04; B65D 1/42; B65D 37/00; B65D 33/02; B65D 25/16; B65D 21/0233
USPC ............ 220/9.4, 495.08, 495.06, 908.1, 908, 220/23.88, 23.89, 23.91, 23.87, 23.83; D32/37, 36
See application file for complete search history.

(56) References Cited

U.S. PATENT DOCUMENTS 2,517,757 A * 8/1950 Adlerstein ................ A45F 3/04 383/41
2,625,973 A * 1/1953 Weldon ................ D06F 95/004 312/211
2,970,628 A * 2/1961 Tames ................... D06F 95/004 383/7
3,130,853 A * 4/1964 Colthurst .................. B65F 1/06 220/495.08
5,560,508 A 10/1996 Hsu
8,047,391 B2 * 11/2011 Lu .......................... A01K 1/033 220/9.3
2006/0285776 A1 * 12/2006 Richardson, Jr. ...... B65D 88/62 383/33
2013/0284734 A1 * 10/2013 Huang .................. B65D 11/22 220/9.4
2015/0122810 A1 * 5/2015 Yang ........................ A45C 3/00 220/9.4
2024/0384461 A1 11/2024 Zheng

FOREIGN PATENT DOCUMENTS

CN 222005956 U 11/2024

OTHER PUBLICATIONS

British Search Report dated Jan. 6, 2026 issued in corresponding application 2511601.3.

* cited by examiner

*Primary Examiner* — Robert J Hicks
(74) *Attorney, Agent, or Firm* — Millen, White, Zelano & Branigan P.C.; Ryan R. Pool

(57) ABSTRACT

Presented is a laundry hamper, including a frame, an outer bag and support rods, wherein a bag opening of the outer bag is connected to the frame; and the frame includes a main body and at least one limiting block detachably connected to the main body, the limiting block has a limiting cavity for limiting an end of each support rod, and the main body or the at least one limiting block is provided with a hook. The laundry hamper is novel in structure, has strong structural stability, and is convenient for users to take out and put in an inner bag.

20 Claims, 12 Drawing Sheets

LAUNDRY HAMPER

CROSS-REFERENCE TO RELATED APPLICATIONS

This application claims priority to Chinese Patent Application No. 202521208552.1, filed Jun. 13, 2025, the contents of which are incorporated herein by reference.

TECHNICAL FIELD

The present application relates to the technical field of articles for daily use, and in particular to a laundry hamper.

BACKGROUND

A laundry hamper is a relatively common article for daily use in domestic life, which is used for holding clothes to be cleaned.

The laundry hamper includes an outline structure and an inner bag, where the outline structure includes an outer bag and a frame disposed at a bag opening of the outer bag. In order to shape the outer bag and keep it in an expanded state all the time, the laundry hamper further includes a plurality of support rods, each having one end supporting the frame, and the other end supporting a bottom of the outer bag, thereby allowing the laundry hamper to be of a three-dimensional structure. However, due to the lack of positioning the support rods, the support rods are prone to shift left and right, which causes the laundry hamper to twist, and even leads to a collapse of the laundry hamper, affecting the use of a user. In addition, in the prior art, olive-shaped buttons are disposed at an opening of the outline structure, hanging ropes matched with the olive-shaped buttons are disposed on the inner bag; and when the user needs to clean clothes, the clothes to be cleaned contained in the inner bag can be taken out of the outline structure together with the inner bag. However, this way of matching the olive-shaped buttons with the hanging ropes requires the user to unfasten the olive-shaped buttons one by one in disassembling the inner bag, and reattach them one by one in hanging the inner bag; and two ends of the olive-shaped buttons need to simultaneously hook the hanging ropes, resulting in a complicated operation process of the user; moreover, the olive-shaped buttons, which are softly connected to the frame or the outer bag via fabric strips, tend to shake freely, and this forces the user to stabilize the olive-shaped button with one hand while handling the inner bag with the other, which wastes time and labour.

SUMMARY

The technical problem to be solved by the present application is to provide a laundry hamper which is stable in structure and convenient for taking out and putting in an inner bag.

In order to solve the above technical problem, a technical solution adopted by the present application is as follows: a laundry hamper includes a frame, an outer bag and support rods, where a bag opening of the outer bag is connected to the frame; and the frame includes a main body and at least one limiting block detachably connected to the main body, the limiting block has a limiting cavity for limiting an end of the support rod, and the main body or the at least one limiting block is provided with a hook.

In an embodiment, the limiting block has a semi-enclosing structure, and the semi-enclosing structure and the outer bag define the limiting cavity.

In an embodiment, the main body is provided with a slot, the limiting block is fixedly inserted into the main body, the main body is further provided with an abutting block, the abutting block is located in the slot, a top end of the support rod abuts against the abutting block, and the abutting block is accommodated in the semi-enclosing structure.

In an embodiment, the limiting block is provided with first elastic clamping blocks, and the main body is provided with first clamping holes matched with the first elastic clamping blocks; or, the limiting block is provided with first clamping holes, and the main body is provided with first elastic clamping blocks matched with the first clamping holes.

In an embodiment, the outer bag is provided with blocking strips, and each of the blocking strips and the outer bag define a limiting area for limiting the support rod.

In an embodiment, the laundry hamper further includes an inner bag, and the inner bag is provided with a hanging opening matched with the hook.

In an embodiment, the hanging opening is formed at the bag opening of the inner bag.

In an embodiment, the inner bag is provided with a hanging rope, and the hanging rope and the inner bag define the hanging opening; or, the hanging opening is a perforation formed in the inner bag; or, the inner bag is provided with a hanging sheet, and the hanging opening is formed between the hanging sheet and an outer surface of the inner bag.

In an embodiment, the inner bag is provided with one or more hanging openings.

In an embodiment, one or more inner bags are provided.

In an embodiment, the inner bag is provided with a first handle.

In an embodiment, the hook is detachably mounted on the main body; or, the hook is integrally formed with the main body.

In an embodiment, the main body is formed by splicing a plurality of structural members, and two adjacent structural members are connected by a fastener.

In an embodiment, the fastener is a buckle, the buckle is provided with a first clamping structure, the structural member is provided with a second clamping structure matched with the first clamping structures, and the first clamping structure is a second elastic clamping block or a second clamping hole.

In an embodiment, the buckle is n-shaped, and two opposite side walls of the buckle are respectively provided with the first clamping structure.

In an embodiment, a reinforcing rib is disposed in the buckle, the reinforcing rib connects the two opposite side walls of the buckle, and two sides of a connecting part of the reinforcing rib and each of the side walls are respectively provided with the first clamping structure.

In an embodiment, the buckle is provided with a positioning column, and the structural member is provided with a positioning hole matched with the positioning column; or, the buckle is provided with a positioning hole, and the structural member is provided with a positioning column matched with the positioning hole.

In an embodiment, the buckle is provided with the hook.

In an embodiment, the hook includes a first arm and a second arm which are connected, a bottom of the first arm is connected to the second arm, and a width of an upper part of the first arm is greater than a width of a lower part of the first arm.

In an embodiment, the upper part and the lower part of the first arm are connected by a transition part, and surfaces of two side walls of the transition part are inclined surfaces or curved surfaces.

The present application has the advantages as follows. The laundry hamper is novel in structure. The frame includes the main body and the limiting block which are detachably connected; and after the support rod is placed in a predetermined position, the limiting block and the main body are connected, so that the end of the support rod is located in the limiting cavity, thereby reducing lateral shaking of the support rod when the laundry hamper is in use, and effectively improving structural stability of the laundry hamper. The limiting block is provided with a hook for hanging the inner bag, which can also facilitate the user to take out and put in the inner bag, simplifies operations of taking out and putting the inner bag by the user, and is beneficial to enhancing use experience of the user; also, when the hook on the limiting block is damaged, it is possible to directly replace a new limiting block with a hook without replacing the frame, which is beneficial to reducing a use cost of the user; moreover, arranging the hook on the limiting block can facilitate forming of the main body, which is beneficial to controlling a manufacturing cost of the frame.

DETAILED DESCRIPTION OF THE EMBODIMENTS

Figure 1:
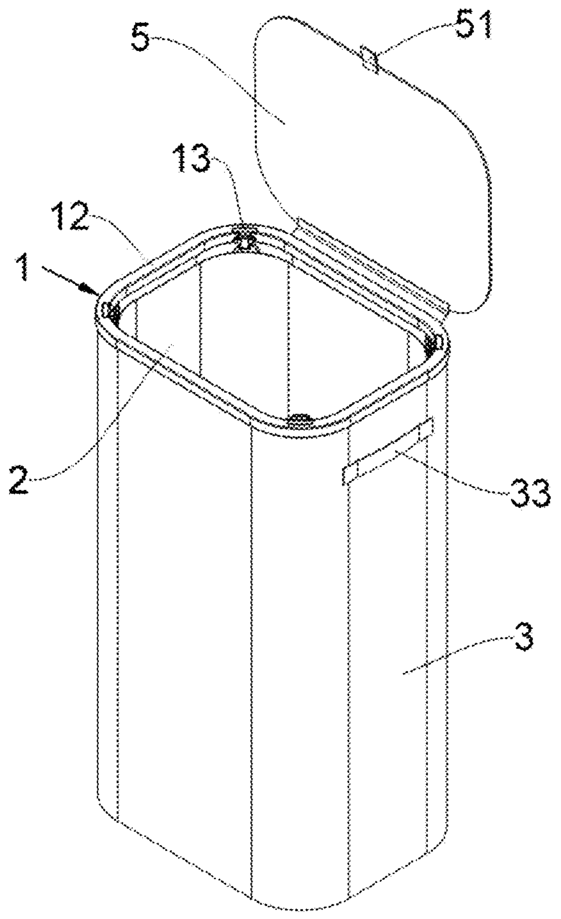
FIG. 1 is a schematic structural diagram of a laundry hamper with a cover plate in an open state in an embodiment.

In order to describe the technical content, the achieved objectives and the effects of the present application in detail, the following description will be given in combination with the implementations and the accompanying drawings.

With reference to FIG. 1 to FIG. 14, a laundry hamper includes a frame 1, an outer bag 3 and support rods 4, where a bag opening of the outer bag 3 is connected to the frame 1; and the frame 1 includes a main body 12 and at least one limiting block 13 detachably connected to the main body 12, the limiting block 13 has a limiting cavity 131 for limiting an end of the support rod 4, and the main body 12 or the at least one limiting block 13 is provided with a hook 11.

As can be seen from the above description, the beneficial effects of the present application are as follows. The laundry hamper is novel in structure. The frame 1 includes the main body 12 and the limiting block 13 which are detachably connected, After the support rod 4 is placed in a predetermined position, the limiting block 13 and the main body 12 are connected, so that the end of the support rod 4 is located in the limiting cavity 131, thereby reducing lateral shaking of the support rod 4 when the laundry hamper is in use, and effectively improving structural stability of the laundry hamper. The limiting block 13 is provided with a hook 11 for hanging the inner bag 2, which can also facilitate a user to take out and put in the inner bag 2, simplifies operations of taking out and putting in the inner bag 2 by the user, and is beneficial to enhancing use experience of the user. In addition, when the hook 11 on the limiting block 13 is damaged, it is possible to directly replace a new limiting block 13 with a hook 11 without replacing the frame 1, which is beneficial to reducing a use cost of the user. Moreover, arranging the hook 11 on the limiting block 13 can facilitate forming of the main body 12, which is beneficial to controlling a manufacturing cost of the frame 1.

In an embodiment, the limiting block 13 has a semi-enclosing structure 133, and the semi-enclosing structure 133 and the outer bag 3 define the limiting cavity 131.

As can be seen from the above description, the limiting block 13 with the semi-enclosing structure 133 is convenient to manufacture, and the semi-enclosing structure 133 and the outer bag 3 define the limiting cavity 131, allowing the support rod 4 to get closer to an inner surface of the outer bag 3, thus increasing an available space of the outer bag 3.

In an embodiment, the main body 12 is provided with a slot 121, the limiting block 13 is fixedly inserted into the main body 12, the main body 12 is further provided with an abutting block 122, the abutting block 122 is located in the slot 121, a top end of the support rod 4 abuts against the abutting block 122, and the abutting block 122 is accommodated in the semi-enclosing structure 133.

As can be seen from the above description, when the limiting block 13 has not been inserted into the main body 12, the user can conveniently place the support rod 4 in a preset position where one end of the support rod 4 abuts against the abutting block 122 and the other end of the support rod 4 abuts against a bottom of the outer bag 3, so as to preliminarily position and mount the support rod 4. Then, the limiting block 13 is inserted into the main body 12, so that a tip of the top end of the support rod 4 is limited in the limiting cavity 131, thereby preventing the support rod 4 from falling down, improving the structural stability of the laundry hamper, avoiding a situation that the main body 12 is provided with a deep hole for inserting the end of the support rod 4 to lead to time and labour wastes of mounting the supporting rod 4, and avoiding a risk that the outer bag 3 is punctured by a bottom end of the support rod 4. Moreover, the semi-enclosing structure 133 on the limiting block 13 makes it possible to arrange the abutting block 122.

In an embodiment, the limiting block 13 is provided with a first elastic clamping block 132, and the main body 12 is provided with a first clamping hole 123 matched with the first clastic clamping block 132; or, the limiting block 13 is provided with a first clamping hole 123, and the main body

12 is provided with a first elastic clamping block 132 matched with the first clamping hole 123.

As can be seen from the above description, the limiting block 13 is connected with the main body 12 in a clamping manner, which facilitates assembly and disassembly of the limiting block 13 while ensuring connection stability between the limiting block 13 and the main body 12.

In an embodiment, the outer bag 3 is provided with blocking strips 31, and each of the blocking strips 31 and the outer bag 3 define a limiting area 32 for limiting the support rod 4.

As can be seen from the above description, the fact that the support rod 4 is located in the limiting area 32 can effectively prevent the support rod 4 from falling down, which is beneficial to improving structural stability of the laundry hamper to a greater extent.

In an embodiment, the laundry hamper further includes an inner bag 2, and the inner bag 2 is provided with a hanging opening 21 matched with the hook 11.

In an embodiment, the hanging opening 21 is formed at the bag opening of the inner bag 2.

As can be seen from the above description, forming the hanging opening 21 at the bag opening of the inner bag 2 can not only facilitate the user to hang the inner bag 2 on the hook 11, but also facilitate the user to open the bag opening of the inner bag 2 and put clothes to be cleaned into the inner bag. Especially, when the inner bag 2 has a plurality of hanging openings 21, the bag opening of the inner bag 2 can be kept in an open state by cooperating with a plurality of hooks 11 on the frame 1, thus facilitating the user to directly put the clothes to be cleaned into the inner bag 2.

In an embodiment, the inner bag 2 is provided with a hanging rope 211, and the hanging rope 211 and the inner bag 2 define the hanging opening 21; or, the hanging opening 21 is a perforation formed in the inner bag 2; or, the inner bag 2 is provided with a hanging sheet 212, and the hanging opening 21 is formed between the hanging sheet 212 and an outer surface of the inner bag 2.

As can be seen from the above description, a specific structure of the hanging opening 21 offers multiple options, which is beneficial to enriching diversity of the inner bag 2.

In an embodiment, the inner bag 2 is provided with one or more hanging openings 21.

As can be seen from the above description, a number of the hanging openings 21 in the inner bag 2 can be set as required.

In an embodiment, there are one or more inner bags 2.

As can be seen from the above description, a number of the inner bags 2 can be set as required; when there is one inner bag 2, the clothes to be cleaned are put together without sorting, which facilitates the user to clean all the clothes to be cleaned at one time; and when there are two inner bags 2, the user can sort and place the clothes to be cleaned separately, which can better meet the user's habit of handling the clothes to be cleaned.

In an embodiment, the inner bag 2 is provided with a first handle 22.

As can be seen from the above description, existence of the first handle 22 facilitates the user to take out, put in and transfer the inner bag 2, which is beneficial to further enhancing the use experience of the user.

In an embodiment, the hook 11 is detachably mounted on the main body 12; or, the hook 11 is integrally formed with the main body 12.

As can be seen from the above description, arranging the hooks 11 on the main body 12 can provide the inner bag 2 with more hooking positions, so that the bag opening of the inner bag 2 can be kept in an open state.

In an embodiment, the main body 12 is formed by splicing a plurality of structural members 14, and two adjacent structural members 14 are connected by a fastener 15.

As can be seen from the above description, the frame 1 is of a detachable structure, and the whole laundry hamper can be folded, thereby reducing a space required for storage and transfer of the laundry hamper and facilitating storage and transfer of the laundry hamper by the user.

In an embodiment, the fastener 15 is a buckle, the buckle is provided with a first clamping structure 151, the structural member 14 is provided with a second clamping structure 141 matched with the first clamping structures 151, and the first clamping structure 151 is a second elastic clamping block or a second clamping hole.

As can be seen from the above description, using the buckle as the fastener 15 can facilitate disassembly of the frame 1 and effectively improve the use experience of the user.

In an embodiment, the buckle is n-shaped, and two opposite side walls 152 of the buckle are respectively provided with the first clamping structure 151.

As can be seen from the above description, the buckle is relatively simple in overall structure, and is convenient to form; and the two opposite side walls 152 of the buckle are respectively provided with the first clamping structure 151, so that the buckle can be stably connected to the structural member 14.

In an embodiment, a reinforcing rib 153 is disposed in the buckle, the reinforcing rib 153 connects the two opposite side walls 152 of the buckle, and two sides of a connecting part of the reinforcing rib 153 and each of the side walls 152 are respectively provided with the first clamping structure 151.

As can be seen from the above description, the reinforcing rib 153 can improve the overall structural strength of the buckle and reduce the risk of a damage of the buckle. Meanwhile, the reinforcing rib 153 can play a role in positioning the tip of the structural member 14 to a certain extent, preventing significant misalignment between the tip of the structural member 14 and a mounting position of the buckle, so that the user can more conveniently align the first clamping structure 151 and the second clamping structure 141.

In an embodiment, the buckle is provided with a positioning column 155, and the structural member 14 is provided with a positioning hole 142 matched with the positioning column 155. Alternatively, the buckle is provided with a positioning hole 142, and the structural member 14 is provided with a positioning column 155 matched with the positioning hole 142.

As can be seen from the above description, matching between the positioning column 155 and the positioning hole 142 can allow the buckle to be more smoothly assembled with two adjacent structural members 14.

In an embodiment, the buckle is provided with the hook 11.

As can be seen from the above description, arranging the hook 11 on the buckle can simplify a structural design of the structural member 14, and at the same time provide more hooking positions for the inner bag 2.

In an embodiment, the hook 11 includes a first arm 111 and a second arm 112 which are connected, a bottom of the first arm 111 is connected to the second arm 112, and a width of an upper part of the first arm 111 is greater than that of a lower part of the first arm 111.

As can be seen from the above description, the first arm 111 of the hook 11 is flat with a wide top and a narrow bottom, and the width of the upper part of the first arm 111 is adapted to the hanging opening 21 of the inner bag 2, facilitating fitting of the hanging opening 21. The lower part of the first arm 111 is narrowed, so that the hanging opening 21 is contracted and hooked to the hook 11, thus preventing easy disengagement. Moreover, due to the flat first arm 111, when the inner bag 2 needs to be taken out, the user can directly grasp the inner bag 2 and lift it up, and the hanging opening 21 can be directly disengaged from the hook 11 with a little force, thereby taking the inner bag 2 out, which makes an operation extremely convenient for the user.

In an embodiment, the upper part and the lower part of the first arm 111 are connected by a transition part 113, and surfaces of two side walls 152 of the transition part 113 are inclined surfaces or curved surfaces.

As can be seen from the above description, existence of the transition part 113 can allow the hanging opening 21 to be more smoothly disengaged from the hook 11 when the user grasps the inner bag 2 and lifts it up.

With reference to FIG. 1 to FIG. 4, a laundry hamper includes a frame 1, an inner bag 2, an outer bag 3 and support rods 4. A bag opening of the outer bag 3 is connected to the frame 1. Each of the support rods 4 is located in the outer bag 3, one end of the support rod 4 abuts against the frame 1, and the other end of the support rod 4 abuts against a bottom of the outer bag 3. The frame 1 includes a main body 12 and at least one limiting block 13 detachably connected to the main body 12. The limiting block 13 has a limiting cavity 131 for limiting an end of the support rod 4, the main body 12 or the at least one limiting block 13 is provided with a hook 11 for hanging the inner bag 2. The inner bag 2 is provided with a hanging opening 21 matched with the hook 11, and is accommodated in the outer bag 3. The outer bag 3 is made of a foldable material, such as cloth, leather, a flexible fiber, etc., and the inner bag 2 is made of a foldable material, such as the cloth, the leather, the flexible fiber, etc.

Specifically, the support rods 4 are respectively mounted at individual corners of the frame 1, so that the outer bag 3 can be completely expanded. The support rod 4 is a rod body with a fixed length. In some embodiments, the support rod 4 is a telescopic rod or a spliced rod formed by splicing a plurality of rod pieces.

Figure 2:
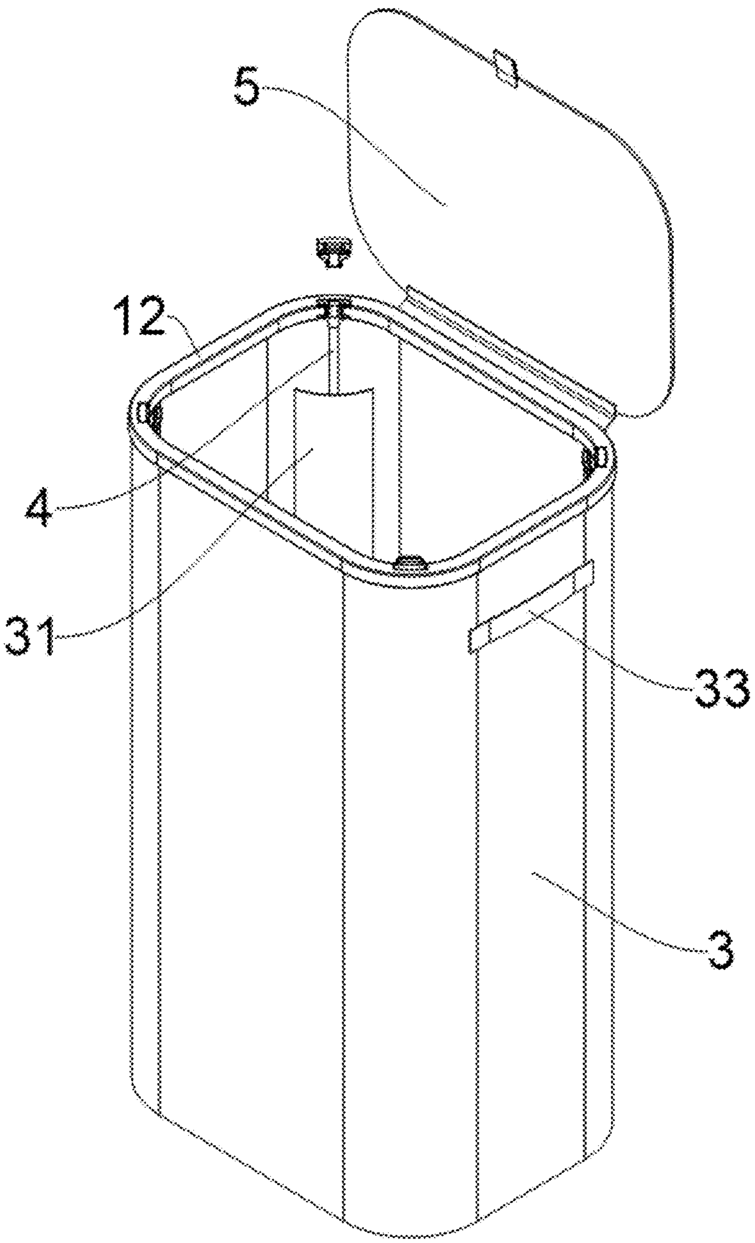
FIG. 2 is a schematic structural diagram of a laundry hamper with an inner bag hidden in an embodiment.
Figure 3:
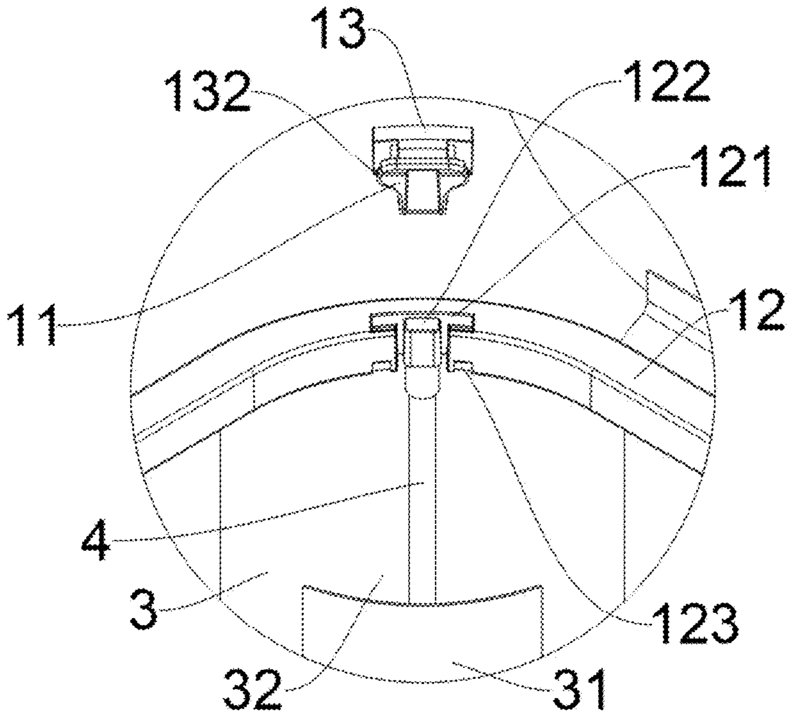
FIG. 3 is an enlarged view of a partial area of FIG. 2.
Figure 4:
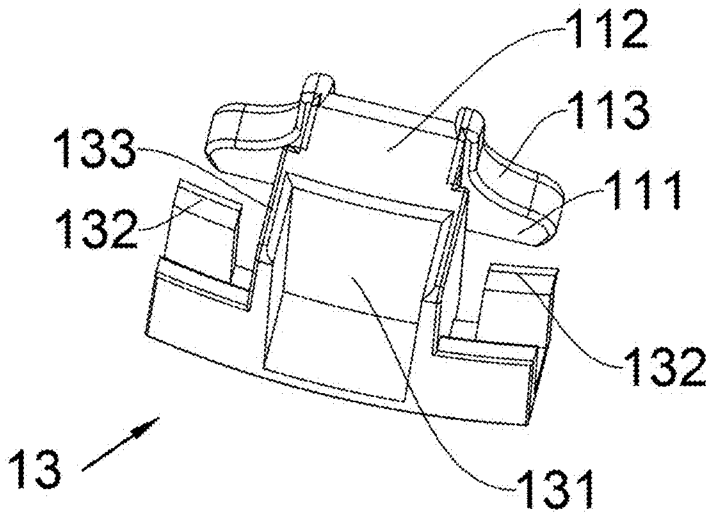
FIG. 4 is a schematic structural diagram of a limiting block in an embodiment.

With reference to FIG. 2 to FIG. 4, in one or more embodiments, the limiting block 13 has a semi-enclosing structure 133, and the semi-enclosing structure 133 and the outer bag 3 define the limiting cavity 131.

In order to facilitate preliminary positioning of the support rod 4, the main body 12 is provided with a slot 121, the limiting block 13 is fixedly inserted into the main body 12, the main body 12 is further provided with an abutting block 122, the abutting block 122 is located in the slot 121, a top end of the support rod 4 abuts against the abutting block 122, and the abutting block 122 is accommodated in the semi-enclosing structure 133.

In an embodiment, the limiting block 13 is provided with a first elastic clamping block 132, and the main body 12 is provided with a first clamping hole 123 matched with the first elastic clamping block 132. Alternatively, the limiting block 13 is provided with a first clamping hole 123, and the main body 12 is provided with a first elastic clamping block 132 matched with the first clamping hole 123. In other embodiments, the limiting block 13 and the main body 12 are connected by a screw.

As shown in FIG. 2 and FIG. 3, in order to further prevent the support rod 4 from falling down, the outer bag 3 is provided with a blocking strip 31, and the blocking strip 31 and the outer bag 3 define a limiting area 32 for limiting the support rod 4.

Figure 5:
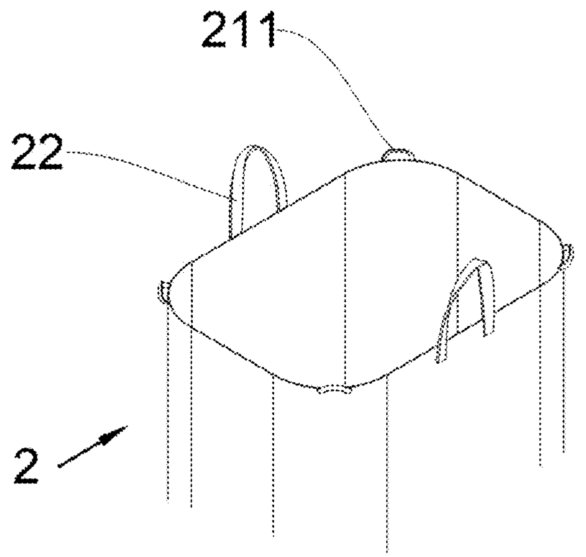
FIG. 5 is a schematic structural diagram of an inner bag in an embodiment.
Figure 6:
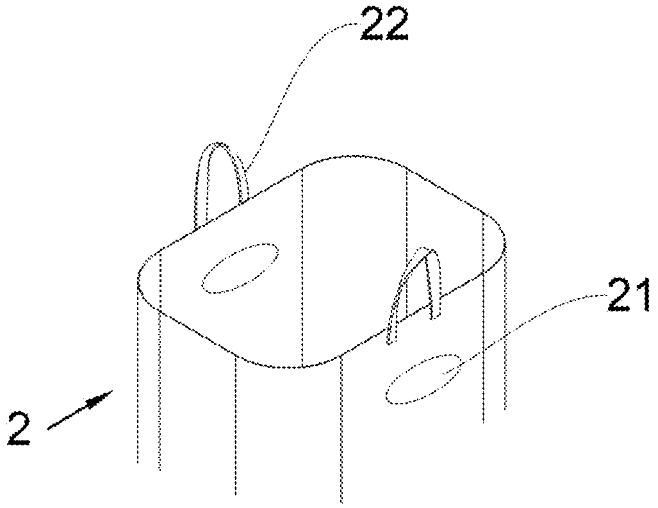
FIG. 6 is a schematic structural diagram of an inner bag in an embodiment.
Figure 7:
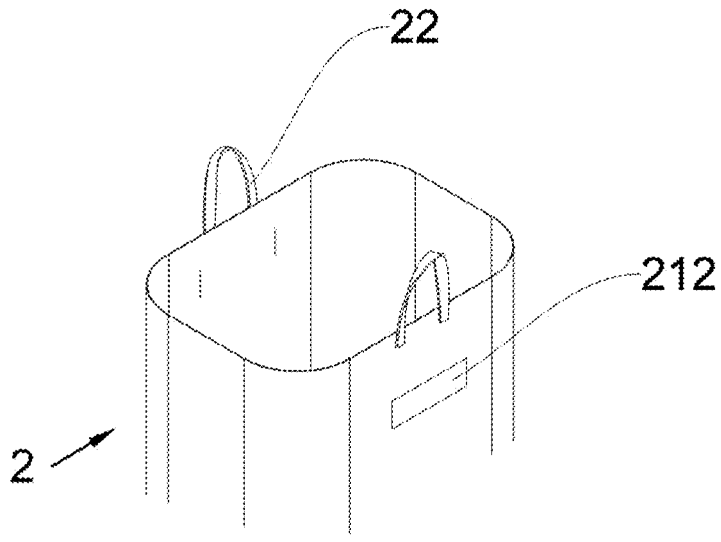
FIG. 7 is a schematic structural diagram of an inner bag in an embodiment.

As shown in FIG. 5 to FIG. 7, the hanging opening 21 is formed at an upper part of the inner bag 2. In this case, the bag opening of the inner bag 2 can be kept in a closed state to shield the clothes to be cleaned in the inner bag 2, so as to protect privacy of users to a certain extent. In some embodiments, the hanging opening 21 is formed at the bag opening of the inner bag 2, so that the bag opening of the inner bag 2 can be opened more easily or kept in an expanded state, facilitating the user to put the clothes to be cleaned into the inner bag 2.

In some embodiments, as shown in FIG. 5, the inner bag 2 is provided with a hanging rope 211, and the hanging rope 211 and the inner bag 2 define the hanging opening 21. Alternatively, as shown in FIG. 6, the hanging opening 21 is a perforation formed in the inner bag 2. Alternatively, as shown in FIG. 7, the inner bag 2 is provided with a hanging sheet 212, and the hanging opening 21 is formed between the hanging sheet 212 and an outer surface of the inner bag 2. Specifically, two opposite ends of the hanging sheet 212 are respectively fixedly connected to the inner bag 2. In this case, the hanging sheet 212 and the inner bag 2 define the hanging opening 21. Alternatively, the hanging opening 21 is formed at the inner bag 2 in other manners.

As shown in FIG. 4, the hook 11 includes a first arm 111 and a second arm 112 which are connected, and a bottom of the first arm 111 is connected to the second arm 112. In some embodiments, a width of an upper part of the first arm 111 is greater than that of a lower part of the first arm 111. With reference to FIG. 3 to FIG. 5, when the hanging opening 21 is defined by the hanging rope 211 and the inner bag 2, the hanging rope 211 adopts an elastic rope. In this case, when the hanging rope 211 is not pulled, a diameter of the hanging opening 21 is less than the width of the upper part of the first arm 111 and greater than the width of the lower part of the first arm 111, which can not only facilitate the hanging opening 21 to be hung on the hook 11, but also prevent the hanging opening 21 from being accidentally disengaged from the hook 11.

In order for the inner bag 2 to be smoothly detached from the hook 11, the upper part and the lower part of the first arm 111 are connected by a transition part 113, and surfaces of two side walls 152 of the transition part 113 are inclined surfaces or curved surfaces.

As shown in FIG. 5 and FIG. 6, the inner bag 2 is provided with one or more hanging openings 21. If there are more hanging openings 21 and at least two of the hanging openings 21 are hung on the hook 11, the bag opening of the inner bag 2 can be kept in a satisfactory open state, facilitating the user to put the clothes to be cleaned into the inner bag 2. In order to make full use of space and facilitate operations of the user, in at least one embodiment, there are four hanging openings 21 in the inner bag 2, and the four hanging openings 21 are respectively located at four corners of the inner bag 2. When the inner bag 2 is hung on the frame 1, the hanging openings 21 located at the four corners of the inner bag 2 are respectively hung on different hooks 11, so that the bag opening of the inner bag 2 can be kept in a completely expanded state all the time, further facilitating the user to put the clothes to be cleaned into the inner bag.

As shown in FIG. 5 to FIG. 7, in order to facilitate the user to take out, put in and transfer the inner bag 2, in some embodiments, the inner bag 2 is provided with a first handle 22.

Figure 9:
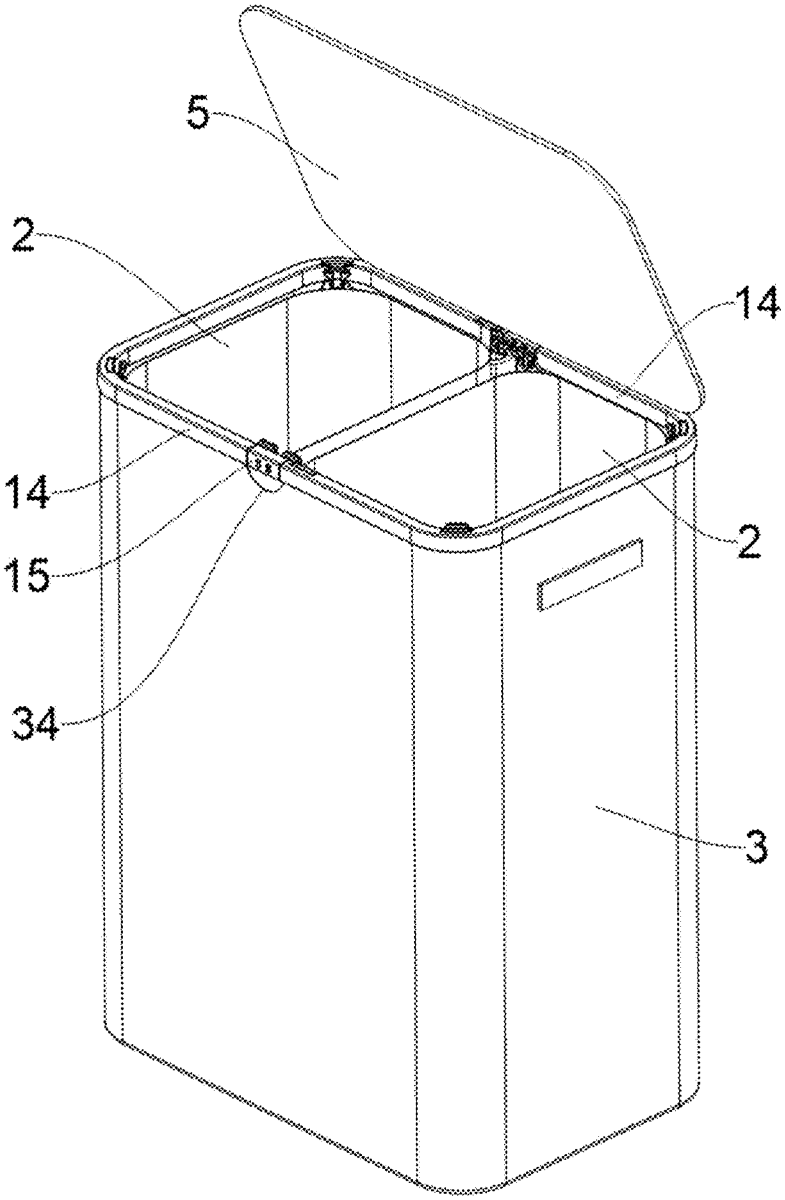
FIG. 9 is a schematic structural diagram of a laundry hamper with a cover plate in an open state in an embodiment.
Figure 13:
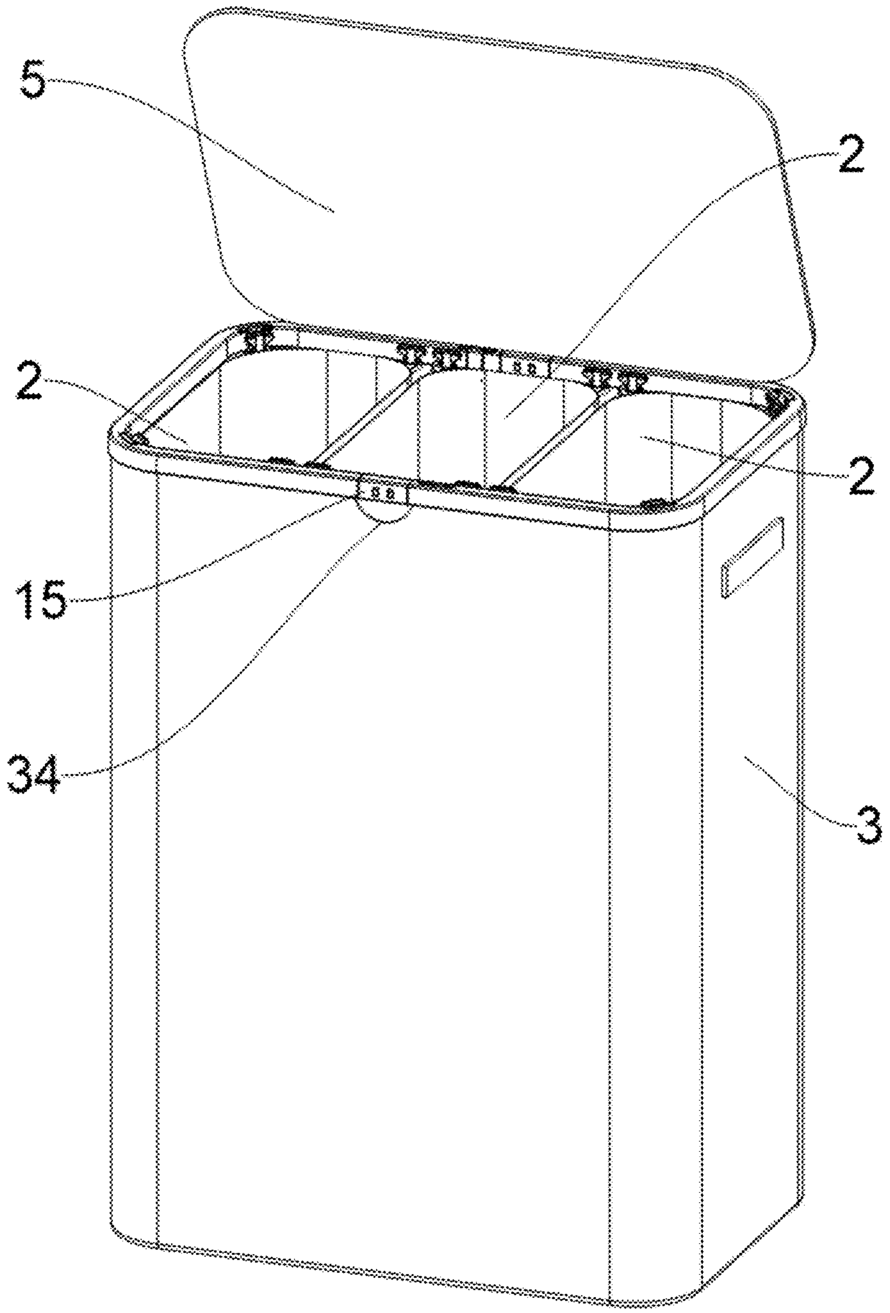
FIG. 13 is a schematic structural diagram of a laundry hamper with a cover plate in an open state in an embodiment.

As shown in FIG. 1, FIG. 9 and FIG. 13, there are one or more inner bags 2 according to different needs of users.

Figure 8:
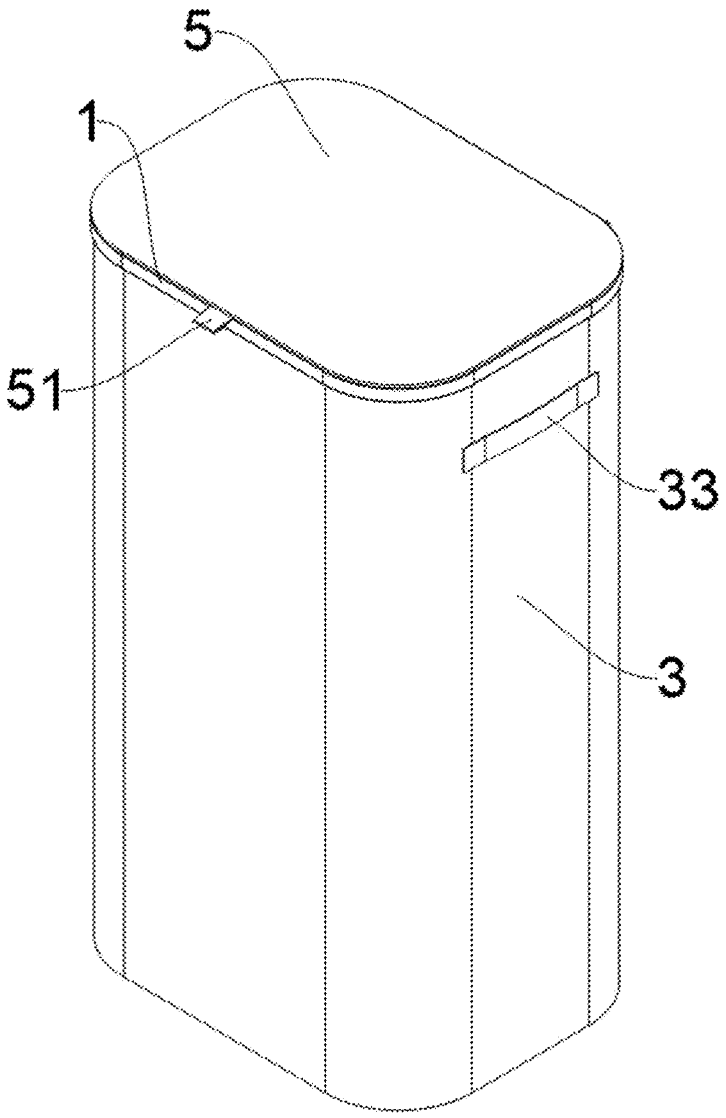
FIG. 8 is a schematic structural diagram of a laundry hamper with a cover plate in a closed state in an embodiment.

As shown in FIG. 1, FIG. 2 and FIG. 8, after the outer bag 3 is fully expanded and fixed by the support rods 4, the outer bag 3 is provided with a second handle 33 for moving the laundry hamper conveniently.

In one or more embodiments, the laundry hamper further has a cover plate 5. The cover plate 5 can rotate relative to the frame 1, and is connected to the frame 1 or the outer bag 3. In order to facilitate opening and closing of the cover plate 5, the cover plate 5 is further provided with an operating piece 51, and the operating piece 51 is a pull rope, a pull tab or other convenient hand-held member.

Figure 10:
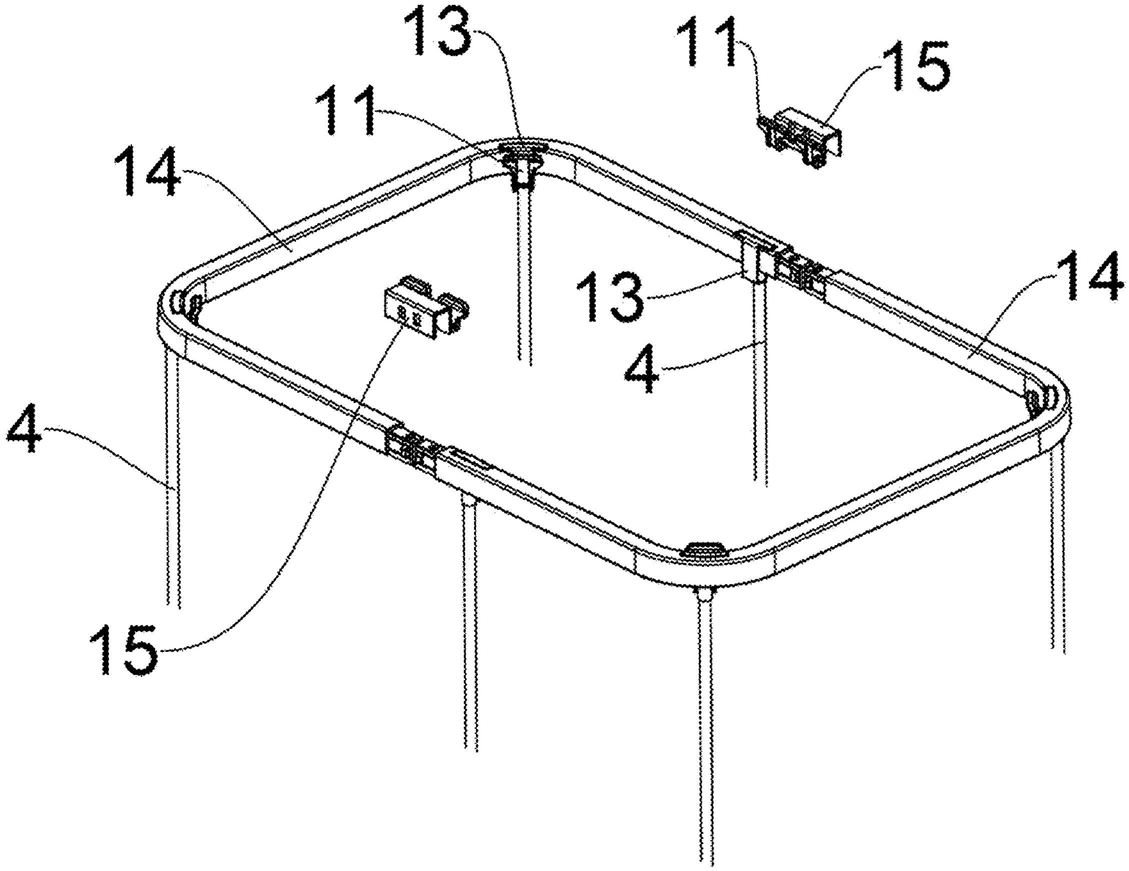
FIG. 10 is a schematic structural diagram of a frame and support rods in an embodiment.
Figure 11:
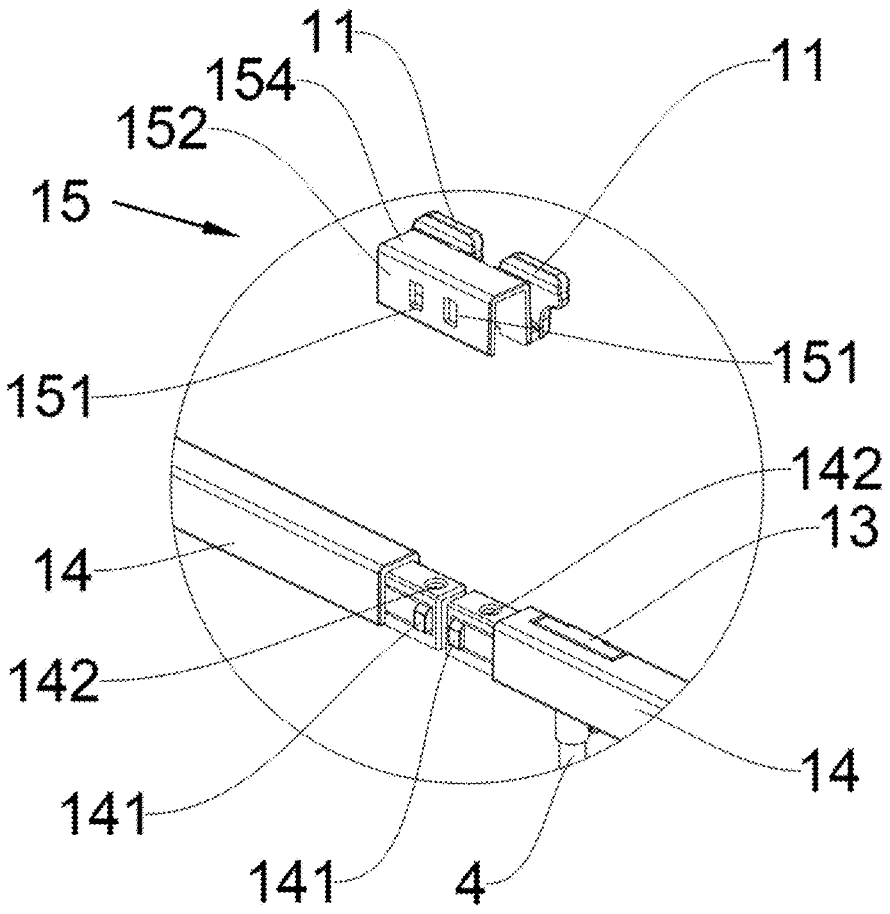
FIG. 11 is an enlarged view of a partial area of FIG. 10.
Figure 12:
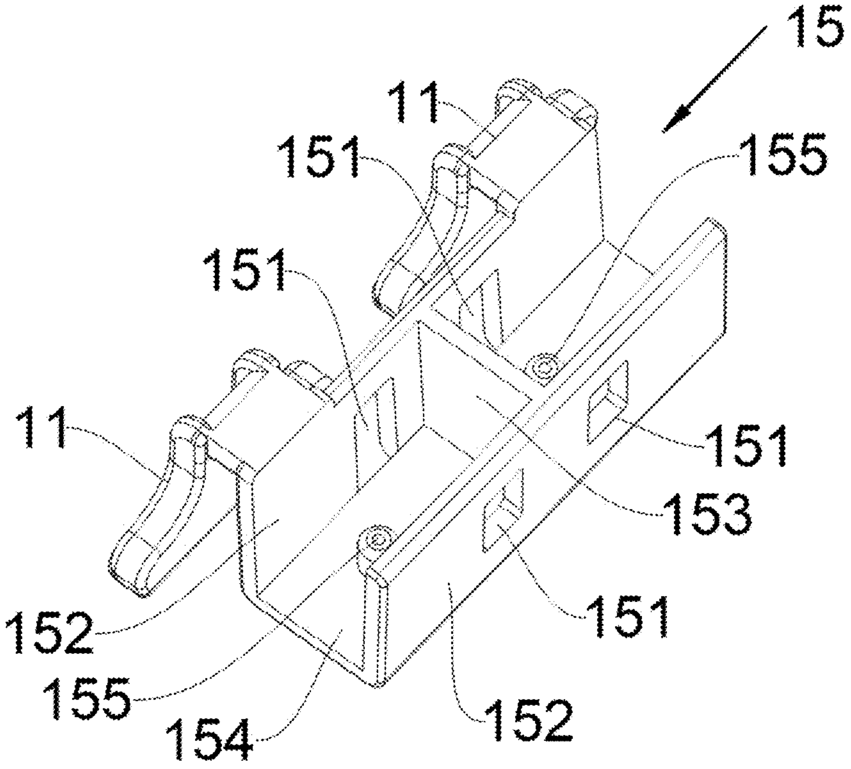
FIG. 12 is a schematic structural diagram of a fastener in an embodiment.
Figure 14:
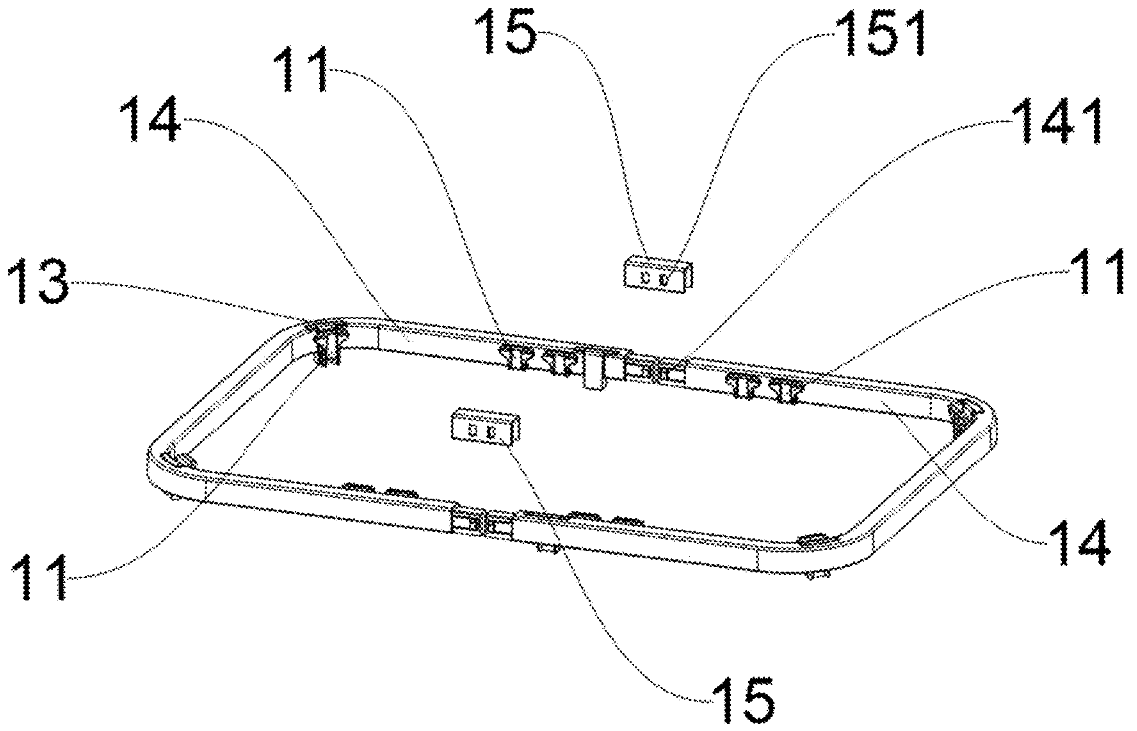
FIG. 14 is an exploded view of a frame in an embodiment.

As shown in FIG. 10 to FIG. 12, in some embodiments, the hook 11 is detachably mounted on the main body 12. Alternatively, as shown in FIG. 14, the hook 11 is integrally formed with the main body 12.

As shown in FIG. 9 to FIG. 14, in a certain embodiment, the main body 12 is formed by splicing a plurality of structural members 14, and two adjacent structural members 14 are connected by a fastener 15. For example, the main body 12 is formed by two structural members 14 in an enclosing manner. The two structural members 14 are U-shaped and are securely connected by using a screw as the fastener 15. For another example, two adjacent structural members 14 are rotatably connected through rotating shafts, and the two rotatably connected structural members 14 are relatively fixed by using a bolt as the fastener 15. In some embodiments, the fastener 15 is a buckle, the buckle is provided with a first clamping structure 151, the structural member 14 is provided with a second clamping structure 141 matched with the first clamping structures 151, and the first clamping structures 151 is a second elastic clamping block or a second clamping hole. When the first clamping structure 151 is a second elastic clamping block, the second clamping structure 141 is a second clamping hole; and when the first clamping structure 151 is a second clamping hole, the second clamping structure 141 is a second elastic clamping block.

As shown in FIG. 12, in some embodiments, the buckle is n-shaped, two opposite side walls 152 of the buckle are respectively provided with the first clamping structure 151; and correspondingly, two sides of a tip of the structural member 14 are respectively provided with the second clamping structure 141.

As shown in FIG. 9 and FIG. 13, to facilitate disassembly and assembly of the buckle by the user and prevent the outer bag 3 from interfering with operations of disassembling and assembling the fasteners 15 by the user, avoidance openings 34 are formed in positions, corresponding to the fasteners 15, of a top of the outer bag 33.

As shown in FIG. 13, in order to improve structural stability of the buckle, the buckle is internally provided with a reinforcing rib 153, which connects the two opposite side walls 152 of the buckle. Two sides of a connecting part of the reinforcing rib 153 and each of the side walls 152 are respectively provided with the first clamping structure 151, and the reinforcing rib 153 can separate tips of two structural members 14. In at least one embodiment, the reinforcing rib 153 is connected to a top plate 154 of the buckle, and the top plate 154 of the buckle is connected to the two side walls 152 of the buckle respectively.

As shown in FIG. 11 and FIG. 12, in an embodiment, the buckle is provided with a positioning column 155, and the structural member 14 is provided with a positioning hole 142 matched with the positioning column 155. Alternatively, the buckle is provided with a positioning hole 142, and the structural member 14 is provided with a positioning column 155 matched with the positioning hole 142.

In some embodiments, the buckle is provided with the hook 11.

The foregoing description is only an embodiment of the present application, and is not to be construed as limiting the scope of the present invention, all equivalent transformations made by using the contents of the specification of the present application and the attached drawings, or directly or indirectly applied to related technical fields, are equally included in the scope of patent protection of the present application.

What is claimed is:

1. A laundry hamper, comprising a frame, an outer bag and at least one support rod, wherein a bag opening of the outer bag is connected to the frame; and the frame comprises a main body and at least one limiting block detachably connected to the main body, the limiting block having a limiting cavity for limiting an end of the at least one support rod, and the main body or the at least one limiting block is provided with a hook.

2. The laundry hamper according to claim 1, wherein the limiting block has a semi-enclosing structure, and the semi-enclosing structure and the outer bag define the limiting cavity.

3. The laundry hamper according to claim 2, wherein the main body is provided with a slot, the limiting block being fixedly inserted into the main body, and wherein the main body is further provided with an abutting block, the abutting block being located in the slot, a top end of the at least one support rod abutting against the abutting block, the abutting block being accommodated in the semi-enclosing structure.

4. The laundry hamper according to claim 1, wherein the limiting block is provided with first elastic clamping blocks, and the main body is provided with first clamping holes matched with the first elastic clamping blocks; or, the limiting block is provided with first clamping holes, and the main body is provided with the first elastic clamping blocks matched with the first clamping holes.

5. The laundry hamper according to claim 1, wherein the outer bag is provided with blocking strips, and each of the blocking strips and the outer bag define a limiting area for limiting the at least one support rod.

6. The laundry hamper according to claim 1, further comprising an inner bag, wherein the inner bag is provided with a hanging opening matched with the hook.

7. The laundry hamper according to claim 6, wherein the hanging opening is formed at the bag opening of the inner bag.

8. The laundry hamper according to claim 6, wherein the inner bag is provided with a hanging rope, and the hanging rope and the inner bag define the hanging opening; or, the hanging opening is a perforation formed in the inner bag; or, the inner bag is provided with a hanging sheet, and the hanging opening is formed between the hanging sheet and an outer surface of the inner bag.

9. The laundry hamper according to claim 6, wherein the inner bag is provided with one or more hanging openings.

10. The laundry hamper according to claim 6, wherein one or more inner bags are provided.

11. The laundry hamper according to claim 6, wherein the inner bag is provided with a first handle.

12. The laundry hamper according to claim 1, wherein the hook is detachably mounted on the main body; or, the hook is integrally formed with the main body.

13. The laundry hamper according to claim 1, wherein the main body is formed by splicing a plurality of structural members, and two adjacent structural members are connected by a fastener.

14. The laundry hamper according to claim 13, wherein the fastener is a buckle, the buckle being provided with a first clamping structure, and wherein the structural member is provided with a second clamping structure matched with the first clamping structure, the first clamping structure being a second elastic clamping block or a second clamping hole.

15. The laundry hamper according to claim 14, wherein the buckle is n-shaped, and two opposite side walls of the buckle are respectively provided with the first clamping structure.

16. The laundry hamper according to claim 15, wherein a reinforcing rib is disposed in the buckle, the reinforcing rib connecting the two opposite side walls of the buckle, two sides of a connecting part of the reinforcing rib and each of the side walls being respectively provided with the first clamping structure.

17. The laundry hamper according to claim 14, wherein the buckle is provided with a positioning column, and the structural member is provided with a positioning hole matched with the positioning column; or, the buckle is provided with a positioning hole, and the structural member is provided with a positioning column matched with the positioning hole.

18. The laundry hamper according to claim 14, wherein the buckle is provided with the hook.

19. The laundry hamper according to claim 1, wherein the hook comprises a first arm and a second arm which are connected, a bottom of the first arm being connected to the second arm, and a width of an upper part of the first arm being greater than a width of a lower part of the first arm.

20. The laundry hamper according to claim 19, wherein the upper part and the lower part of the first arm are connected by a transition part, and surfaces of two side walls of the transition part are inclined surfaces or curved surfaces.

* * * * *